United States Patent
Tsao et al.

(10) Patent No.: US 10,140,047 B2
(45) Date of Patent: Nov. 27, 2018

(54) DATA STORAGE SYSTEM

(71) Applicant: AccelStor, Inc., Taipei (TW)

(72) Inventors: Shih-Chiang Tsao, Taipei (TW);
Ting-Fang Chien, Taipei (TW);
An-Nan Chang, Taipei (TW)

(73) Assignee: ACCELSTOR, INC., Taipei (TW)

( * ) Notice: Subject to any disclaimer, the term of this patent is extended or adjusted under 35 U.S.C. 154(b) by 173 days.

(21) Appl. No.: 15/256,848

(22) Filed: Sep. 6, 2016

(65) Prior Publication Data

US 2018/0046394 A1   Feb. 15, 2018

(30) Foreign Application Priority Data

Aug. 9, 2016   (CN) .......................... 2016 1 0643692

(51) Int. Cl.
*G06F 3/06* (2006.01)
*G06F 12/02* (2006.01)

(52) U.S. Cl.
CPC .......... *G06F 3/0641* (2013.01); *G06F 3/0608* (2013.01); *G06F 3/0659* (2013.01); *G06F 3/0665* (2013.01); *G06F 3/0674* (2013.01); *G06F 12/0253* (2013.01); *G06F 12/0292* (2013.01); *G06F 2212/1044* (2013.01); *G06F 2212/152* (2013.01)

(58) Field of Classification Search
CPC .... G06F 3/0641; G06F 3/0608; G06F 3/0659; G06F 3/0665; G06F 3/0674; G06F 12/0253; G06F 12/0292; G06F 2212/1044; G06F 2212/152
See application file for complete search history.

(56) References Cited

U.S. PATENT DOCUMENTS

| | | | | |
|---|---|---|---|---|
| 5,737,742 A * | 4/1998 | Achiwa | ................. | G06F 12/023 365/189.09 |
| 9,514,146 B1 * | 12/2016 | Wallace | .............. | H03M 7/3091 |
| 2009/0234870 A1 * | 9/2009 | Bates | ................. | G06F 17/30489 |
| 2010/0042790 A1 * | 2/2010 | Mondal | ................. | G06F 3/0608 711/161 |
| 2010/0217952 A1 * | 8/2010 | Iyer | ..................... | G06F 12/0897 711/209 |
| 2011/0296087 A1 * | 12/2011 | Kim | ..................... | G06F 12/0246 711/103 |
| 2016/0179395 A1 * | 6/2016 | Fisher | ................... | G06F 3/0608 711/103 |

* cited by examiner

*Primary Examiner* — Larry T Mackall
(74) *Attorney, Agent, or Firm* — McClure, Qualey & Rodack, LLP

(57) ABSTRACT

The data storage system includes a memory, a hard disk, and a processing unit. A first logical address and a second logical address in a first logical block of the memory correspond to a piece of duplicated data, and the duplicated data is stored in two physical pages in the hard disk. When executing a de-duplication command, the processing unit transfers the duplicated data to a physical page mapped to a third logical address in a second logical block of the memory; the physical page has a third physical address, and the processing unit updates a first mapping relationship to make it provide a mapping relationship between the first logical address and the third logical address and a mapping relationship between the second logical address and the third logical address, and stores the mapping relationship between the third logical address and the third physical address in the memory.

10 Claims, 6 Drawing Sheets

| A | B |
|---|---|
| KEY1 | KEY6 |
| KEY2 | KEY7 |
| KEY3 | KEY8 |
| KEY4 | KEY9 |
| KEY5 | KEY10 |

DATA STORAGE SYSTEM

CROSS-REFERENCES TO RELATED APPLICATIONS

This non-provisional application claims priority under 35 U.S.C. § 119(a) on Patent Application No. 201610643692.0 filed in China, P.R.C. on 2016/08/09, the entire contents of which are hereby incorporated by reference.

BACKGROUND

Technical Field

The present invention relates to a data storage system, and more specifically, to a data storage system having a function of data de-duplication.

Related Art

A data de-duplication technology is a data reduction technology, and is usually used in a hard disk; for example, two or more duplicates of a same file may occur in a hard disk. An objective of data de-duplication lies in deleting redundant data in a hard disk, so as to release a storage space for other data to use.

In a known data de-duplication technology, generally, a key value sample database must be first established in a memory, and a key value of each piece of data is calculated by using a central processing unit (CPU) when each piece of data is to be written into a hard disk, and the CPU compares the key value with a key value sample in the sample database; if the comparison result is that the key value is the same as the key value sample in the sample database, the CPU executes a de-duplication program, and if the comparison result is that the key value is different from the key value sample in the sample database, the CPU adds the foregoing key value into the sample database. Therefore, a capacity of the key value sample database is associated with an accuracy of determining whether data is duplicated data. Then, to improve the accuracy, increasing the capacity of the sample database so as to keep all sample key values results in excessive occupation of a memory space, and time for searching for key value samples in a large sample database is along; further, if a memory with a small capacity is used, when a quantity of key value samples has reached an upper limit of the sample database, some of key values are necessarily discarded; in this case, the foregoing accuracy is caused to be reduced. Therefore, how to maintain the accuracy of determining whether data is duplicated data in a limited memory space is really one of current important research and development problems.

Further, the known data de-duplication technology is generally to perform data de-duplication immediately after receiving a write requirement from an output/input (I/O) apparatus, and establish a location relationship table of duplicated data, and store the location relationship table in a volatile memory; if the volatile memory suffers power supply interruption, the duplicated data relationship table is lost and cannot be re-established; to prevent power supply interruption, a non-volatile memory must be used; when there is a large quantity of duplicated data, a huge location relationship table occupies most storable space in the memory. Moreover, after duplicated data is found each time, the location relationship table must be updated immediately, which also occupies CPU resources greatly.

SUMMARY

In view of this, the present invention provides a data storage system.

In some embodiments, a data storage system includes a memory, a hard disk, and a processing unit. The memory includes a first logical block and a second logical block. The first logical block includes multiple logical pages, where two logical pages in the logical pages have a first logical address and a second logical address; the first logical block is configured to store a first mapping relationship, where the first mapping relationship provides a mapping relationship between the first logical address and a first physical address, and the first mapping relationship provides a mapping relationship between the foregoing second logical address and a second physical address; the second logical block includes multiple logical pages, and one logical page in the logical pages has a third logical address. The hard disk includes multiple physical pages, where a first physical page, a second physical page, and a third physical page in the physical pages respectively have the first physical address, the second physical address, and the third physical address; the first physical page and the second physical page store a piece of same duplicated data; the two pieces of duplicated data respectively correspond to the first logical address and the second logical address; the processing unit is configured to execute a de-duplication command; when executing the de-duplication command, the processing unit configures the third logical address to be mapped to the third physical address, and stores the duplicated data in the third physical page; moreover, when updating the first mapping relationship, the processing unit makes the first logical address and the second logical address mapped to the third logical address synchronously, and the processing unit further stores a second mapping relationship in the second logical block, where the second mapping relationship provides a mapping relationship between the third logical address and the third physical address.

In some embodiments, the foregoing memory further includes a key value table; the processing unit is further configured to execute a write command and a read command, where the write command includes a piece of written data; when executing the write command, the processing unit does not add a key value of the written data into the key value table; the processing unit determines whether the key value of the written data exists in the key value table; when executing the read command, the processing unit does not determine whether a key value of the read data exists in the key value table, and the processing unit adds a key value of a piece of read data from the hard disk into the key value table.

In some embodiments, the foregoing hard disk further includes an operating system, and the hard disk has a file system compatible with the operating system; where the file system discriminates each piece of written data from an I/O apparatus into multiple file attributes and a file content; each file content is stored in the physical pages, and the processing unit executes the operating system to compare whether each file attribute of at least two pieces of written data in multiple pieces of written data is the same so as to selectively execute the de-duplication command.

In some embodiments, the foregoing file system provides a file indicator, where the file indicator provides a location correspondence between the file attributes and the file content of each piece of the written data; when each file attribute of the at least two pieces of written data in the multiple pieces of written data from the I/O apparatus is the same, the processing unit reads file contents of the foregoing at least two pieces of written data according to the file indicator, and according to the file contents of the foregoing at least two pieces of written data, the processing unit calculates and compares key values of two pieces of written data, so as to selectively execute the de-duplication command.

In some embodiments, when each file attribute of the at least two pieces of the foregoing written data in the multiple pieces of written data is the same, the operating system generates a process identifier (PID) that indicates the de-duplication command, so as to enable the processing unit to execute the de-duplication command.

In some embodiments, the foregoing operating system further generates another PID that indicates a data compression program, so that the processing unit further performs data compression on each piece of written data according to the another PID.

In some embodiments, after executing the de-duplication command, the foregoing processing unit is further configured to execute a garbage collection command; when executing the garbage collection command, the processing unit stores the written data in a fourth physical page in the physical pages; where the fourth physical page has a fourth physical address, and the processing unit updates the second mapping relationship so that the second mapping relationship provides a mapping relationship between the third logical address and the fourth physical address.

In some embodiments, after receiving multiple write commands sent, at different time points, by an I/O apparatus, the foregoing processing unit starts to execute the de-duplication command.

In some embodiments, the addresses in the foregoing first logical block can be accessed by a user, while the addresses in the foregoing second logical block cannot be accessed by the user, and the second logical block can only be used by a system when a data de-duplication program is performed; in other words, the first logical block is readable and writable, and the second logical block is read-only.

In some embodiments, the foregoing processing unit separately writes the duplicated data onto the first physical page and the second physical page; and the memory is a volatile memory; when a power source recovers power supply after supply interruption, the hard disk stores a correspondence between the duplicated data and the first logical address and the second logical address, and the processing unit re-establishes the mapping relationship between the first logical address and the first physical address and the mapping relationship between the second logical address and the second physical address according to the correspondence, and the first physical address and the second physical address where the duplicated data is stored separately.

In summary, according to an embodiment of the data storage system of the present invention, executing, by the processing unit, a de-duplication instruction in an offline manner, and establishing a double-layer mapping relationship between duplicated data and physical addresses can reduce the number of times of updating a mapping relationship between a logical address and a physical address so as to greatly simplify complexity of design of hardware and software, and ensure secession of hard disk writing, and can further restore a location relationship of the duplicated data after power supply interruption; further, performing a duplicated data determining program on a file-layer can reduce the number of times of reading the hard disk; further still, guessing possibility of data duplication meaningfully when executing a write command can store key value samples in a database with a small capacity so as to reduce comparison time and maintain an accuracy of determining whether data is duplicated data.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
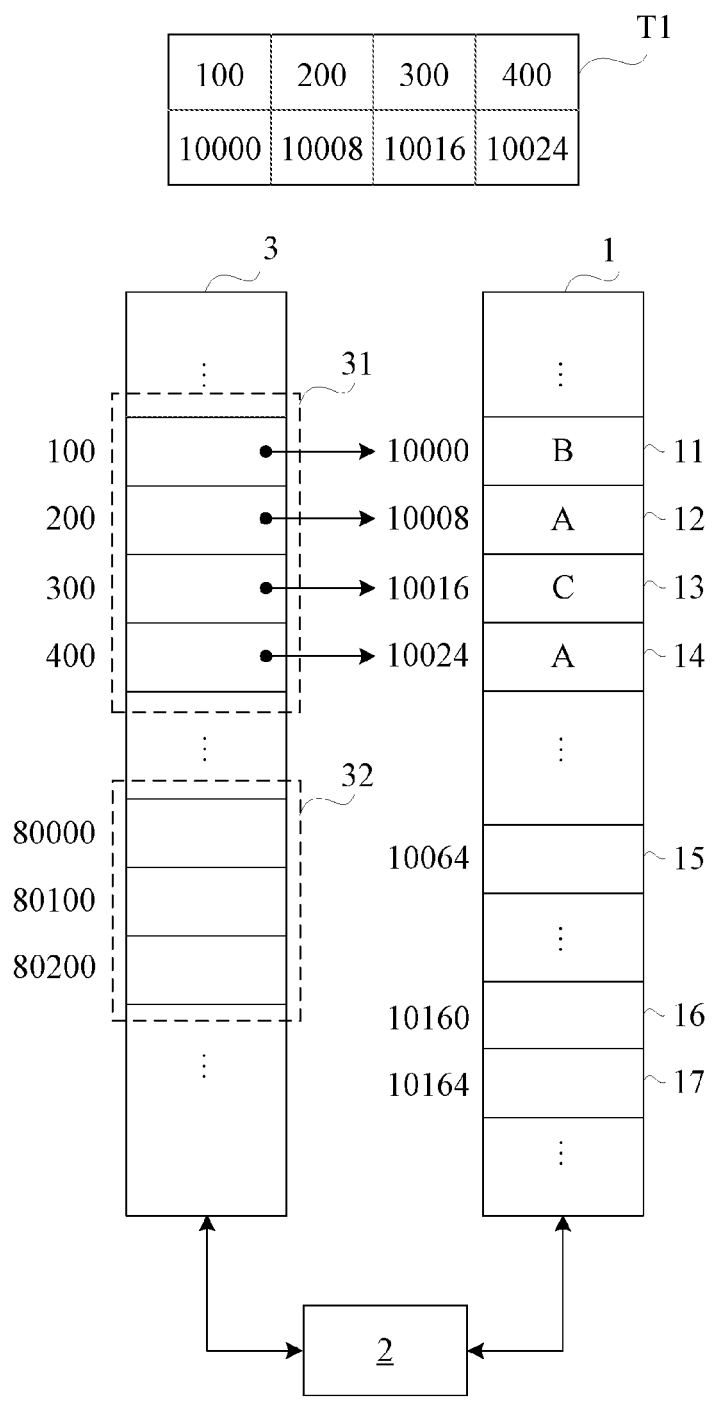
FIG. 1 is a block schematic diagram of an embodiment of a data storage system according to the present invention.
Figure 2:
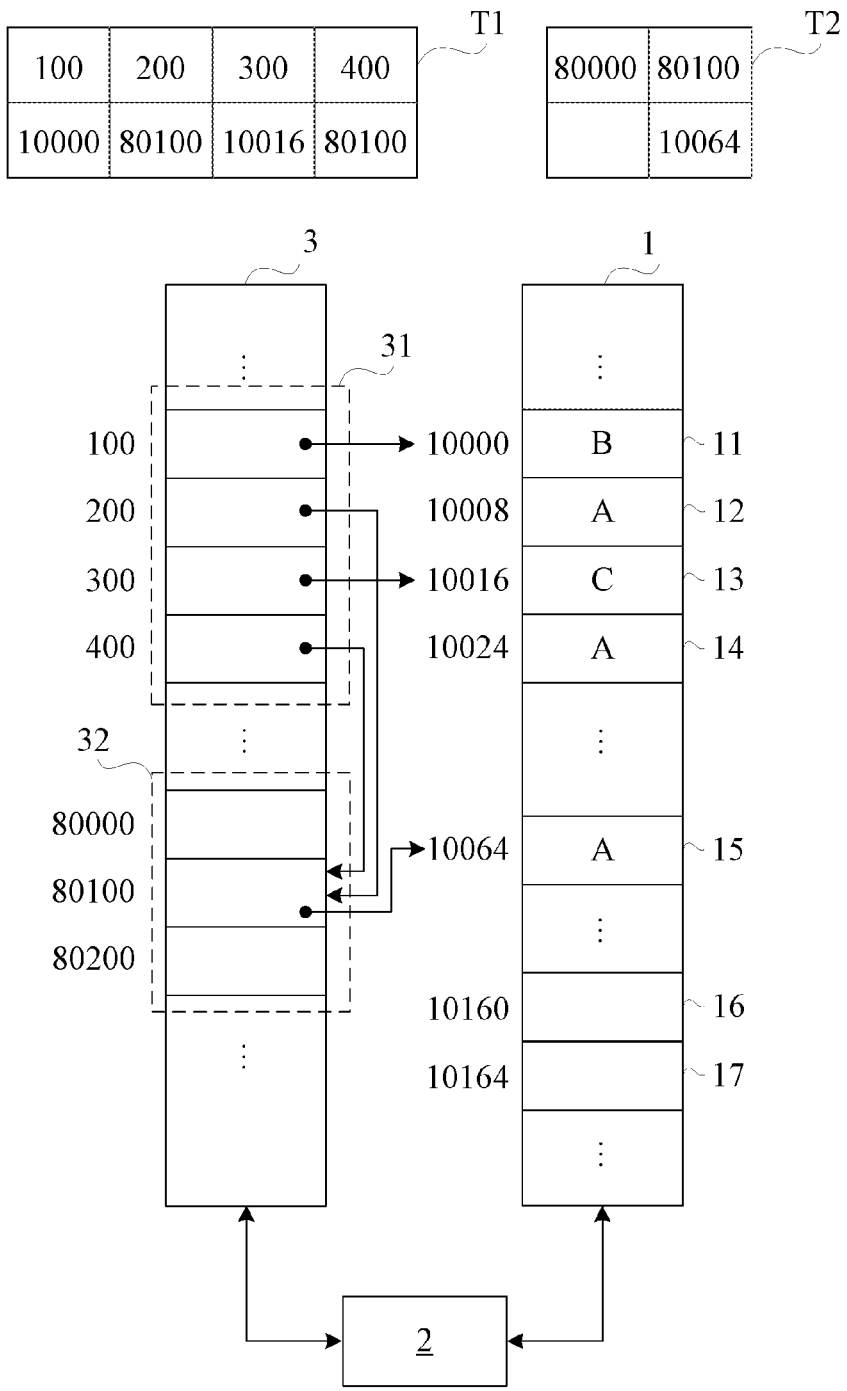
FIG. 2 is a schematic diagram of an embodiment of performing, by a data storage system of FIG. 1, a data de-duplication program.

FIG. 1 is a block schematic diagram of an embodiment of a data storage system according to the present invention. FIG. 2 is a schematic diagram of an embodiment of performing, by a data storage system of FIG. 1, a data de-duplication program. Refer to FIG. 1 and FIG. 2 at the same time. The data storage system includes a hard disk 1, a processing unit 2, and a memory 3. The processing unit 2 is coupled to the memory 3 and the hard disk 1, so as to control an operation of the hard disk 1 and the memory 3. The data storage system can perform a duplicated data determining program and a data de-duplication program. In some implementation manners, the memory 3 may be a non-volatile memory or a volatile memory; the hard disk 1 may be a solid-state disk (SSD), and the processing unit 2 may be a CPU, a microprocessor, a microcontroller, or an application-specific IC (ASIC) having an operation and control function.

The hard disk 1 is used to store data, and includes multiple physical pages; each physical page has a physical address. As shown in FIG. 1, FIG. 1 illustrates seven physical pages 11-17 in the multiple physical pages; physical addresses of the physical pages 11-17 are respectively "10000", "10008", "10016", "10024", "10064", "10160", and "10164".

The memory 3 includes a first logical block 31 and a second logical block 31, where the first logical block 31 and the second logical block 32 respectively covers different address spaces in the memory 3 and include multiple logical pages. For example, by using FIG. 1 as an example, a base address of the address space covered by the first logical block is "100", and an offset of the address is "100"; a base address of the address space covered by the second logical block 32 is "80000", and an offset of the address is "100". Hence, FIG. 1 illustrates that logical addresses of four logical pages in the first logical block 31 are respectively "100", "200", "300", and "400", and logical addresses of three logical pages in the second first logical block 32 are respectively "80000", "80100", and "80200". In some implementation manners, the address spaces respectively covered by the first logical block 31 and the second logical block 32 are variable, and can be configured in a static manner or can be dynamically allocated by the processing unit 2 according to a memory space allocation condition at that time, so as to determine address spaces of the first logical block 31 and the second logical block 32. Moreover, the logical addresses in the first logical block 31 and the second logical block 32 may be logical page numbers, and the physical addresses of the hard disk 1 may be physical page numbers.

The first logical block 31 is used to store a mapping relationship (for the convenience of description, called a first mapping relationship in the following). The first mapping relationship provides mapping between the logical addresses in the first logical block 31 and the physical addresses of the hard disk 1. As shown in FIG. 1, the first mapping relationship can make the logical addresses "100", "200", "300", and "400" respectively mapped to the physical addresses "10000", "10008", "10016", and "10024". The first mapping relationship is also presented by using a table T1 in FIG. 1. In some implementation manners, by using that the foregoing logical addresses and physical addresses are respectively logical page numbers and physical page numbers as an example, the physical page numbers can be stored in the logical pages to enable the logical page numbers to be mapped to the physical page numbers.

It should be noted that the addresses in the first logical block 31 can be accessed by a user, while the second logical block 32 can only be used by a system when the data de-duplication program is performed, and cannot be accessed by the user. On such basis, when the user operates an I/O apparatus to generate a write requirement, the processing unit 2 executes multiple write commands from the I/O apparatus; where each write command includes written data and a logical address corresponding to the written data. For example, the written data may be "A", "B", "C", and "A", which are respectively corresponding to the logical addresses "100", "200", "300", and "400" in the first logical block 31. Although the written data "A" is duplicated data, the processing unit 2 does not immediately execute a de-duplication command; the processing unit 2 respectively writes the written data "A", "B", "C", and "A" onto the physical pages 11, 12, 13, and 14 according to the first mapping relationship. After writing the four pieces of written data into the hard disk 1, the processing unit 2 executes other write commands from the I/O apparatus; the processing unit 2 also writes other written data onto other physical pages in the hard disk 1 according to the first mapping relationship. According to FIG. 1, it can also be obtained that the duplicated data "A" corresponds to the two logical addresses "200" and "400" (respectively called a first logical address and a second logical address in the following).

When the processing unit 2 executes the de-duplication command, the processing unit 2 configures a corresponding quantity of logical addresses in the second logical block 32 according to a quantity of the duplicated data in the hard disk 1, and configures the foregoing logical addresses to be one-to-one mapped to the physical addresses in the hard disk 1. For example, if the processing unit 2 wants to perform de-duplication on four pieces of duplicated data in the hard disk 1, then the processing unit 2 can configure four logical addresses in the second logical block 32, and the four logical addresses are separately one-to-one mapped to a physical address. By using that a piece of duplicated data is the written data "A" for example, in the data de-duplication program, the processing unit 2 can configure a logical address (called a third logical address) of the second logical block 32, for example, "80100", which is mapped to the physical address "10064". Next, as shown in FIG. 2, the processing unit 2 writes the written data "A" of the duplicated data onto a physical page 15, of which the physical address is "10064". In this case, a location, where the written data A is stored, in the hard disk 1 has changed. Then, as shown in FIG. 2, the processing unit 2 updates the first mapping relationship to make the first logical address "200" in the first mapping relationship mapped to the third logical address "80100", and make the second logical address "400" mapped to the third logical address (80100) (a table T1 in FIG. 2 presents the updated first mapping relationship); moreover, the processing unit 2 stores a mapping relationship (called a second mapping relationship in the following) capable of indicating that the third logical address "800100" is mapped to the physical address "10064" in the second logical block 32 (the second mapping relationship is also presented by using a table T2 in FIG. 2). However, after the processing unit 2 executes the de-duplication command, the first logical address and the second logical address are not directly mapped to physical addresses; the first logical address and the second logical address are first mapped to the second logical block 32 by means of the first mapping relationship and are then indirectly mapped to physical addresses by means of a direct mapping relationship between the third logical address and a physical address.

Similarly, if another piece of duplicated data is stored in some other physical pages in the hard disk 1, and the another piece of duplicated data corresponds to multiple logical addresses in the first logical block 31, for example, three logical addresses (called a fourth logical address, a fifth logical address, and a sixth logical address in the following), then the processing unit 2 configures another logical address (called a seventh logical address in the following) in the second logical block 32 to be one-to-one mapped to a physical address, for example, "10164", in the hard disk 1, stores the foregoing another piece of duplicated data in a physical page 17, of which the physical address is "10164", updates the first mapping relationship, and adds the one-to-one mapping relationship between the seventh logical address and the physical address "10164" into the second mapping relationship, so as to enable the fourth logical address, the fifth logical address, and the sixth logical address to be mapped to the physical address "10164" by means of the seventh logical address in the second logical block 32. Hence, the processing unit 2 can repeat the foregoing steps to transfer all duplicated data in the hard disk 1.

After the processing unit 2 executes the write command, because the processing unit 2 respectively writes two pieces of duplicated data "A" onto the physical pages 12 and 14, in some implementation manners, if the memory 3 is a volatile memory, suppose that power supply interruption of a power source occurs, consequently, data in the memory 3 disappears and the first mapping relationship stored in the first logical block 31 is lost; after the power source recovers power supply to make the data storage system recover power supply, the original first mapping relationship can be re-established according to a location, where each piece of written data is stored, in the hard disk 1, and a correspondence between each piece of written data and a logical address. For example, the hard disk 1 stores correspondences between the written data "B", "A", "C", and "A" and the logical address "100", "200", "300", and "400", and therefore a mapping relationship between the logical address "100" and the physical address "10000" can be re-established according to that the written data "B" is stored in the physical layer 11; a mapping relationship between the logical address "200" and the physical address "10008" can be re-established according to that the written data "A" is stored in the physical layer 12; a mapping relationship between the logical address "300" and the physical address "10016" can be re-established according to that the written data "C" is stored in the physical layer 13; and a mapping relationship between the logical address "400" and the physical address "10024" can be re-established according to that the written data "A" is stored in the physical layer 14. Then, as compared with the prior art, if power supply interruption occurs after the written data is stored in the physical pages, mapping relationships between the logical addresses and the physical addresses of the duplicated data can also be re-established after power supply recovery.

In some implementation manners, after the multiple write commands at different time points of the I/O apparatus are executed (that is, the processing unit 2 executes the de-duplication command in a post-processing manner), the processing unit 2 starts to determine whether data is duplicated data and transfer the duplicated data. Moreover, after the mapping relationships between the logical addresses and the physical addresses of the duplicated data are stored in the memory 3, the processing unit 2 starts to delete the written data "A" in the physical pages 12 and 14 and keep the written data "A" in the physical page 16. To prevent an occasion where power supply interruption may occur after the data de-duplication is performed, in this implementation manner, the memory 3 may be a non-volatile memory to memorize the mapping relationships between the logical addresses and the physical addresses of the duplicated data.

Figure 3:
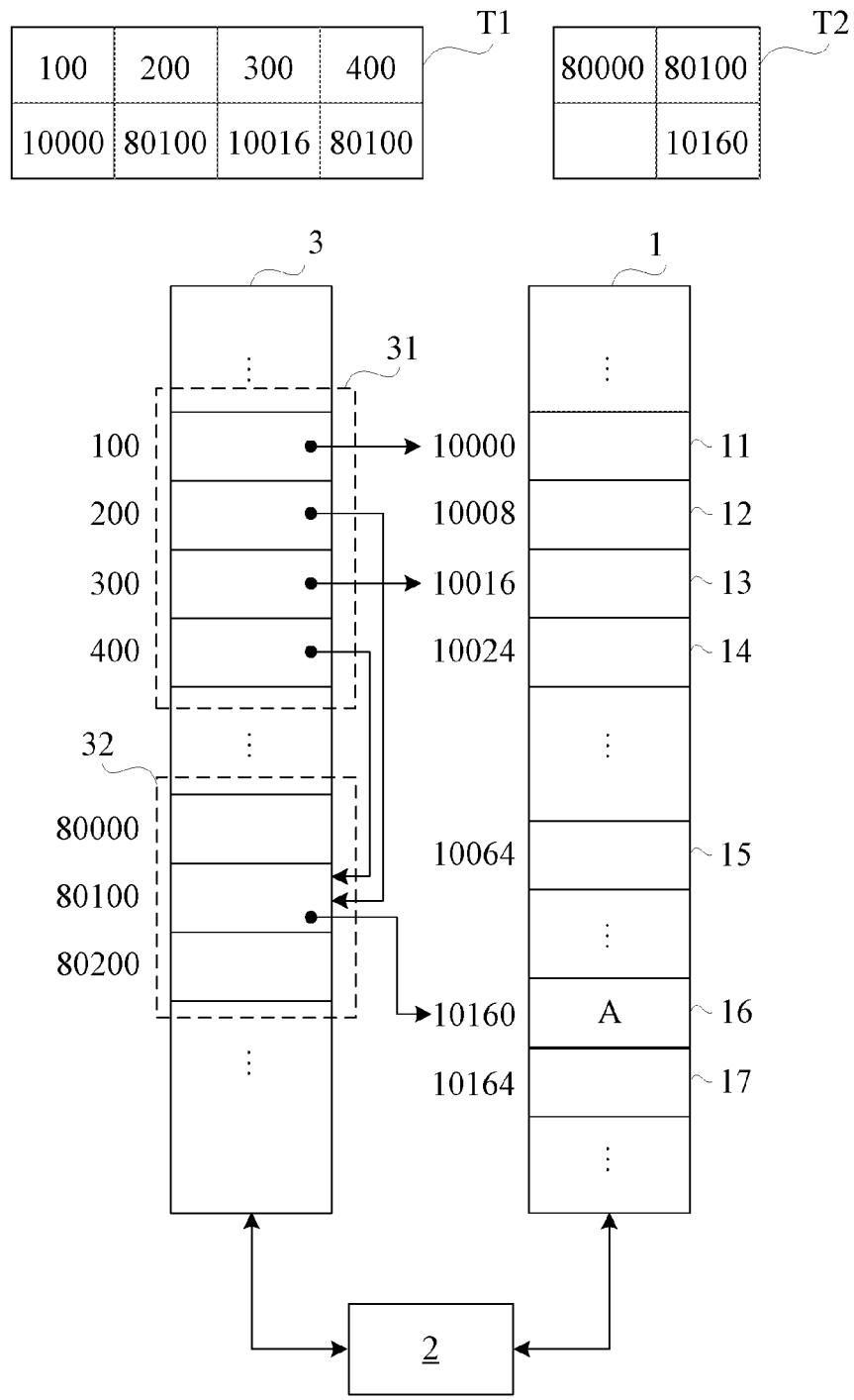
FIG. 3 is a schematic diagram of an embodiment of performing, by a data storage system of FIG. 1, a garbage collection program.

FIG. 3 is a schematic diagram of an embodiment of performing, by a data storage system of FIG. 1, a garbage collection program. In some implementation manners, the data storage program can also perform the garbage collection program. After a processing unit 2 performs a de-duplication command, if a storable space of a hard disk 1 is less than a critical value (or satisfying a self-set condition for performing garbage collection), for example, a remaining storable space of the hard disk 1 is 20%; in this case, the processing unit 2 can perform a garbage collection command. By using that the processing unit 2 wants to perform garbage collection on written data "A", refer to FIG. 3; the processing unit 2 can transfer the written data "A" onto other physical pages, for example, a physical layer 16. Then, because a location where the written data A is stored has changed, the processing unit 2 updates a second mapping relationship, to make a first logical address "80100" in the second mapping relationship mapped to a physical address "10160". The processing unit 2 can perform a transfer action on other written data and update the second mapping relationship to complete garbage collection.

Figure 4:
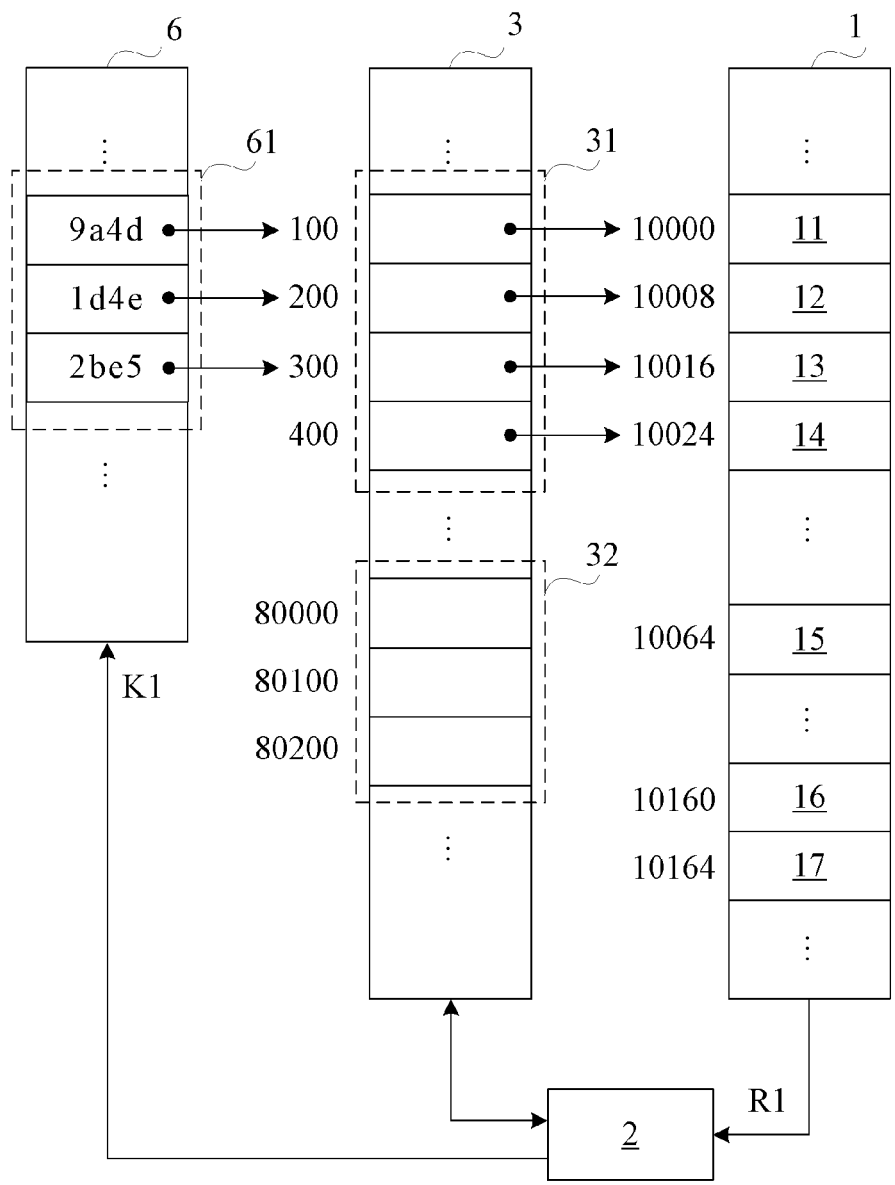
FIG. 4 is a schematic diagram of an embodiment of performing, by a processing unit of FIG. 1, a read command.
Figure 5:
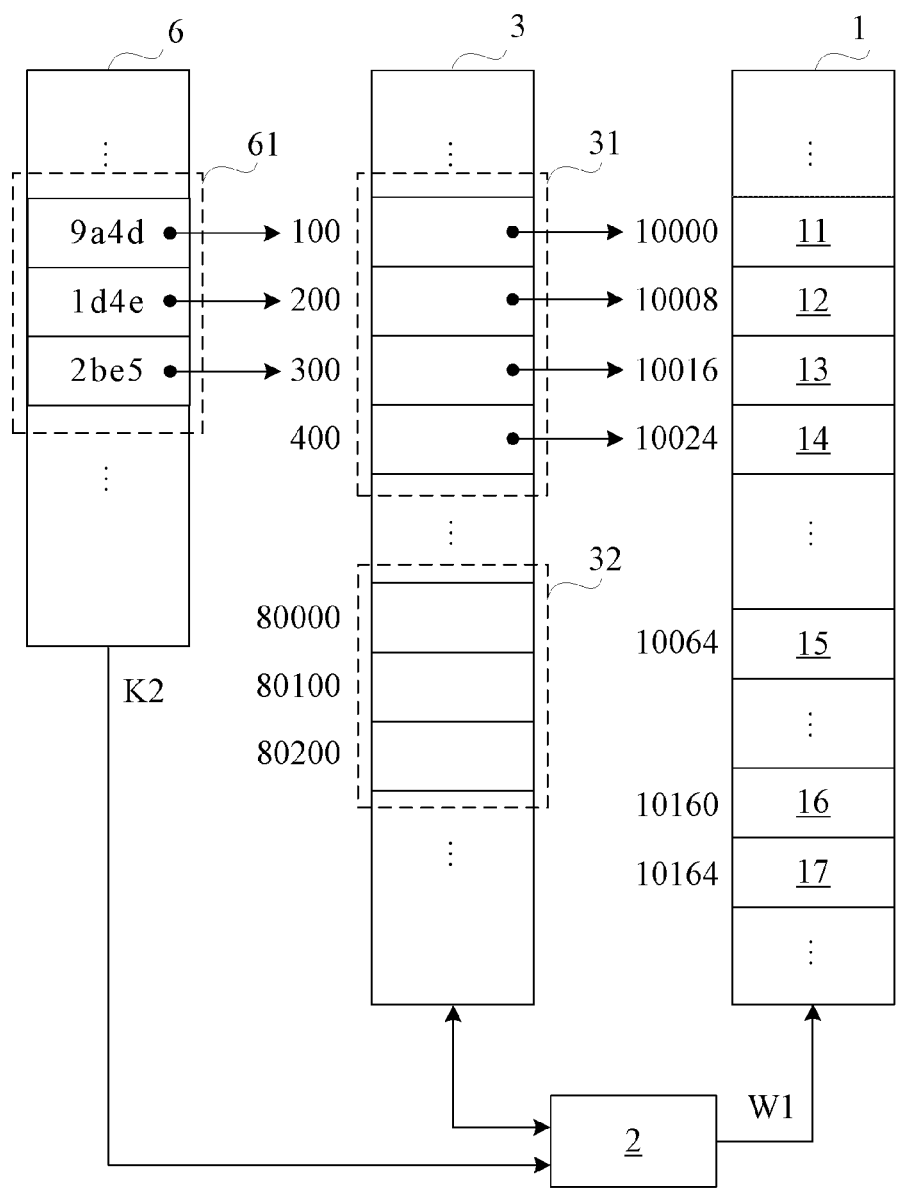
FIG. 5 is a schematic diagram of an embodiment of performing, by a processing unit of FIG. 1, a write command.

FIG. 4 is a schematic diagram of an embodiment of performing, by a processing unit 2 of FIG. 1, a read command. FIG. 5 is a schematic diagram of an embodiment of performing, by a processing unit 2 of FIG. 1, a write command. In some implementation manners, a data storage system first performs a duplicated data determining program before performing a data de-duplication program; the processing unit 2 compares a key value (or called a fingerprint) of data with a sample value of the key value so as to determine duplicated data. Hence, refer to FIG. 4 and FIG. 5 at the same time; the data storage system may further include a memory 6, and the memory 6 stores a key value table 61; as shown in FIG. 4 and FIG. 5, the key value table 61 includes multiple sample values, for example, 9a4d, 1d4e, or 2be5 in a hexadecimal notation; the processing unit 2 may add key a value into the key value table 61 as a sample value. Further, according to an action of access to the hard disk 1 by a user, data duplication usually occurs when data replication is performed on the hard disk 1; while the data replication includes a read action and a write action later than the read action on the hard disk 1. If read data read from the hard disk 1 at an earlier time point is the same as written data to be written into the hard disk 1 at a later time point, it indicates that before a write action occurs, the written data to be written into the hard disk 1 has been stored in the hard disk 1, and therefore the written data accompanying the write action is duplicated data. Therefore, the key value table 61 only needs to cover a key value of read data read in a duplication action without having to cover key values of all data stored in the hard disk 1; the memory 6 may be a memory with a small capacity. In some implementation manners, the memory 6 may be a cache memory.

As shown in FIG. 4, when executing a read command, the processing unit 2 can calculate a key value K1 of read data R1 from the hard disk 1, and adds the key value K1 into the key value table 61; in this case, the processing unit 2 does not determine whether the key value K1 exists in the key value table 61. As shown in FIG. 5, when executing a write command, the processing unit 2 calculates a key value of written data W1; in this case, the processing unit 2 does not add the key value of the written data W1 into the key value table 61, instead, reads the key value table 61 to compare whether a sample value K2 of the key value is the same as the key value of the written data W1 so as to determine whether the key value of the written data W1 exists in the key value table 61. In a case where the written data W1 is the same as the read data R1 (that is, the written data W1 is duplicated data), when the write action occurs, the processing unit 2 compares the key value of the written data W1 with the sample value, and finds that the key value of the written data W1 is the same as the sample value, that is, it indicates that the written data W1 is the same as the read data R1, and is duplicated data. As compared with the prior art, because a time point of the read action is close to that of the write action in a data replication action, before a sample value is discarded, the processing unit 2 determines whether data is duplicated data (that is, comparing the sample value with the key value of the written data W1). Therefore, even a memory space that can store sample values is small, the processing unit 2 can still determine whether data is duplicated data so as to save the memory space, and searching, in a small memory space, for sample values can save time for searching for the sample values. In some implementation manners, hash values of the written data and read data can be calculated by using a message-digest algorithm 5 (MD5) or a secure hash algorithm (SHA) as key values.

Figures 6, 7:
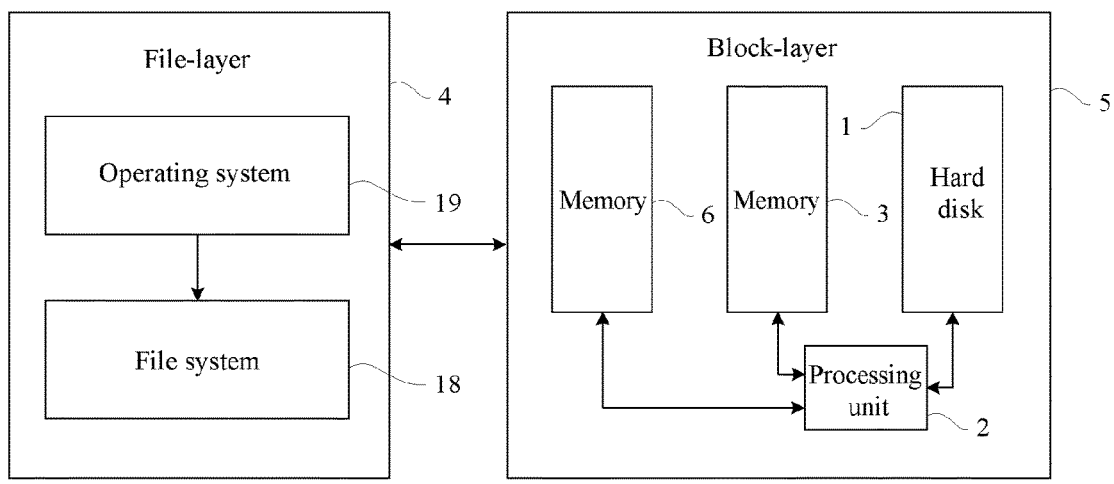
FIG. 6 is a schematic diagram of another implementation manner of a data storage system of FIG. 1.
FIG. 7 is a schematic diagram of an implementation manner of two file contents compared by a processing unit of FIG. 1.

FIG. 6 is a schematic diagram of another implementation manner of a data storage system of FIG. 1. In some implementation manners, refer to FIG. 6; a hard disk 1 may store an operating system 19, which may be a Windows system, a Unix system, or a Linux system; the hard disk 1 has a file system 18 compatible with the operating system 19, for example, a common file allocation table (FAT) new technology file system (NTFS) of the foregoing Windows system, or an common extended file system (EXT) 2/3/4 of the Unix or Linux system. The file system 18 discriminates each piece of written data from an I/O apparatus into two parts; one part is file attributes of the written data, for example, access time, a file name, a file size, and a file form of the written data, and the other part is a file content of the written data, for example, file contents that are indicated as the foregoing English letters "A", "B", and "C". Moreover, the file system 18 plans a storage space of the hard disk 1 into two areas (called a first area and a second area in the following); the first area is an address space covered by physical pages 11-17, and is used to store the file content of the written data, while the second area is mainly used to store the file attributes of the written data. Hence, as shown in FIG. 6, the operating system 19 and the file system 18 belong to a file-layer 4, while a processing unit 2 and two memories 3 and 6 belong to a block-layer 5; the processing unit 2 can perform the operating system 19 to compare the file attributes of the written data, and determine whether duplicated data is included in the written data by determining whether the file attributes of the written data are the same, so as to selectively perform a de-duplication command.

For example, if file attributes of two pieces of written data are different, it indicates that the two pieces of written data are not duplicated data, and then the processing unit 2 does not execute the de-duplication command; otherwise, if the file name, file size, and establishment time of the two pieces of written data are all consistent, it indicates a great possibility that duplicated data is included in the two pieces of written data; in this case, the processing unit 2 may further compare key values of the two pieces of written data without having to compare the key values of the two pieces of written data with all sample values. If the comparison result indicates that the key values of the two pieces of written data are the same, the processing unit 2 executes the de-duplication command.

Further, the first area in the hard disk 1 may further store a file indicator, which provides a location correspondence between each file attribute and each file content. When file attributes of two pieces of written data are the same, the processing unit 2 respectively reads, on physical pages, file contents of the two pieces of written data having the same file attributes according to the file indicator, so as to determine whether key values of the two pieces of written data are the same by means of the two file contents, so as to selectively perform the de-duplication command.

In some other implementation manners, when file attributes of two pieces of written data are the same, the operating system 19 can generate a PID that indicates the de-duplication command, so as to enable the processing unit 2 to execute the de-duplication command according to the PID. In some other embodiments, the PID can be also applied to a data compression technology, that is, when a condition for performing data compression is satisfied, the operating system 19 can generate a PID that indicates a data compression program, so as to enable the processing unit 2 to perform data compression on the written data in the hard disk 1 according to the PID.

In some implementation manners, after the processing unit 2 reads file contents of two pieces of written data from the hard disk 1, the processing unit 2 separately cuts the two file contents. As shown in FIG. 7, the two file contents are respectively a file content A and a file content B; the file contents A and B are separately cut into 5 parts; the processing unit 2 calculates a key value of each part of the file content A to generate "key 1", "key 2", "key 3", "key 4", and "key 5", and the processing unit 2 calculates a key value of each part of the file content B to generate "key 6", "key 7", "key 8", "key 9", and "key 10", and the processing unit 2 compares "key 1" with "key 6", compares "key 2" with "key 7", compares "key 3" with "key 8", compares "key 4" with "key 9", and compares [key 5] with [key 10]; if any comparison result is that two key values are different, it indicates that the foregoing two pieces of written data are not duplicated data. If any comparison result is that two key values are the same, it indicates that duplicated data is included in the two pieces of written data.

In summary, according to an embodiment of the data storage system of the present invention, executing, by the processing unit, a de-duplication instruction in an offline manner, and establishing a double-layer mapping relationship between duplicated data and physical addresses can reduce the number of times of updating a mapping relationship between a logical address and a physical address so as to greatly simplify complexity of design of hardware and software, and ensure secession of hard disk writing, and can further restore a location relationship of the duplicated data after power supply interruption; further, performing a duplicated data determining program on a file-layer can reduce the number of times of reading the hard disk; further still, guessing possibility of data duplication meaningfully when executing a write command can store key value samples in a database with a small capacity so as to reduce comparison time and maintain an accuracy of determining whether data is duplicated data.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A data storage system, comprising:
  a memory, comprising:
    a first logical block, which comprises multiple logical pages, wherein two logical pages in the logical pages have a first logical address and a second logical address; the first logical block is configured to store a first mapping relationship, wherein the first mapping relationship provides a mapping relationship between the first logical address and a first physical address, and the first mapping relationship provides a mapping relationship between the second logical address and a second physical address; and
    a second logical block, which comprises multiple logical pages, and one logical page in the logical pages has a third logical address;
  a hard disk, which comprises multiple physical pages, wherein a first physical page, a second physical page, and a third physical page in the physical pages respectively have the first physical address, the second physical address, and the third physical address; the first physical page and the second physical page store a piece of same duplicated data; the two pieces of duplicated data respectively correspond to the first logical address and the second logical address; and
  a processor, configured to execute a de-duplication command; when executing the de-duplication command, the processor configures the third logical address to be mapped to the third physical address, and stores the duplicated data in the third physical page; moreover, when updating the first mapping relationship, the processor makes the first logical address and the second logical address mapped to the third logical address synchronously, and the processor further stores a second mapping relationship in the second logical block, wherein the second mapping relationship provides a mapping relationship between the third logical address and the third physical address.

2. The data storage system according to claim 1, further comprising another memory for storing a key value table; the processor is further configured to execute a write command and a read command, wherein the write command comprises a piece of written data; when executing the write command, the processor does not add a key value of the written data into the key value table; the processor determines whether the key value of the written data exists in the key value table; when executing the read command, the processor does not determine whether a key value of the read data exists in the key value table, and the processor adds a key value of a piece of read data from the hard disk into the key value table.

3. The data storage system according to claim 1, wherein the hard disk further comprises an operating system, and the hard disk has a file system compatible with the operating system; wherein the file system discriminates each piece of written data from an output/input (I/O) apparatus into multiple file attributes and a file content; each file content is stored in the physical pages, and the processor executes the operating system to compare whether each file attribute of at least two pieces of written data in these pieces of written data is the same so as to selectively execute the de-duplication command.

4. The data storage system according to claim 3, wherein the file system provides a file indicator, wherein the file indicator provides a location correspondence between each file attribute and the file content of each piece of the written data; when each file attribute of the at least two pieces of written data in these pieces of written data from the I/O apparatus is the same, the processor reads file contents of the at least two pieces of written data according to the file indicator, and according to the file contents of the at least two pieces of written data, the processor calculates and compares key values of the at least two pieces of written data, so as to selectively execute the de-duplication command.

5. The data storage system according to claim 3, wherein when each file attribute of the at least two pieces of written data in these pieces of written data is the same, the operating system generates a process identifier (PID) that indicates the de-duplication command, so as to enable the processor to execute the de-duplication command.

6. The data storage system according to claim 5, wherein the operating system further generates another PID that indicates a data compression program, so that the processor further performs data compression on each piece of written data according to the another PID.

7. The data storage system according to claim 1, wherein after executing the de-duplication command, the processor is further configured to execute a garbage collection command; when executing the garbage collection command, the processor stores the written data in a fourth physical page in the physical pages; wherein the fourth physical page has a fourth physical address, and the processor updates the second mapping relationship so that the second mapping relationship provides a mapping relationship between the third logical address and the fourth physical address.

8. The data storage system according to claim 1, wherein after receiving multiple write commands sent, at different time points, by an I/O apparatus, the processor starts to execute the de-duplication command.

9. The data storage system according to claim 1, wherein the first logical block is readable and writable, and the second logical block is read-only for a user.

10. The data storage system according to claim 1, wherein the processor separately writes the duplicated data onto the first physical page and the second physical page; the memory is a volatile memory; when a power source recovers power supply after supply interruption, the hard disk stores a correspondence between the duplicated data and the first logical address and the second logical address, and the processor re-establishes the mapping relationship between the first logical address and the first physical address and the mapping relationship between the second logical address and the second physical address according to the correspondence, and the first physical address and the second physical address where the duplicated data is stored separately.

* * * * *

UNITED STATES PATENT AND TRADEMARK OFFICE
CERTIFICATE OF CORRECTION

PATENT NO. : 10,140,047 B2  
APPLICATION NO. : 15/256848  
DATED : November 27, 2018  
INVENTOR(S) : Tsao et al.

Page 1 of 1

It is certified that error appears in the above-identified patent and that said Letters Patent is hereby corrected as shown below:

On the Title Page

Item (73), please delete "ACCELSTOR, INC." and insert therefor: -- ACCELSTOR LTD. --

Signed and Sealed this  
Thirteenth Day of August, 2019

Andrei Iancu  
*Director of the United States Patent and Trademark Office*